Patented June 4, 1946

2,401,346

UNITED STATES PATENT OFFICE 2,401,346

POLYMERIZATION OF BUTADIENE-1,3 HYDROCARBONS

Charles F. Fryling, Akron, Ohio, assignor to The B. F. Goodrich Company, New York, N. Y., a corporation of New York No Drawing. Application February 25, 1944, Serial No. 523,895

8 Claims. (Cl. 260—86.5)

This invention relates to the polymerization in aqueous emulsion of butadiene-1,3 hydrocarbons or mixtures thereof with other unsaturated compounds copolymerizable therewith in aqueous emulsion, to produce rubbery or resinous copolymers, and particularly to a method of conducting such polymerizations whereby rubbery polymers and copolymers, or synthetic rubber, of improved quality may be produced in a short time.

It is known that the polymerization of butadiene-1,3 hydrocarbons or mixtures thereof with other unsaturated compounds, called comonomers, such as styrene and acrylonitrile, may be modified so as to produce plastic, soluble, rubbery materials resembling unvulcanized natural rubber rather than non-plastic materials resembling vulcanized rubber, by conducting the polymerization in the presence of certain sulfur-containing compounds called "modifiers." For example, it is disclosed in U. S. Patent No. 2,248,107 to Meisenburg et al. that products of increased plasticity and solubility may be obtained by conducting the polymerization in the presence of certain sulfur-containing organic compounds such as bis(isopropylxanthogen). The use of such modifiers, however, results in the disadvantage that the rate of polymerization is thereby retarded; consequently it has not been possible when using such modifiers to produce the synthetic rubber in the shortest possible time.

It has also been disclosed in U. S. Patent No. 2,281,613 to Wollthan et al. that aliphatic mercaptans containing at least six carbon atoms may be employed as modifiers to increase the plasticity and solubility of the synthetic rubbers obtained by polymerization of butadiene-1,3 hydrocarbons. However, it has been found that such mercaptans possess the disadvantage that the synthetic rubbers produced by polymerization in their presence are inferior in physical properties such as tensile strength.

I have now discovered that these disadvantages attending the use of either xanthogen compounds alone or mercaptans alone as the polymerization modifier may be substantially eliminated by employing both a xanthogen and a mercaptan in the emulsion during the polymerization. Thus, it has been found that the polymerization in aqueous emulsion of butadiene-1,3 hydrocarbons or mixtures thereof with copolymerizable compounds in the presence of both a xanthogen compound and a mercaptan proceeds rapidly without any retardation and that the products so obtained possess tensile strengths as high and even higher than those obtained by the use of xanthogens alone. Moreover, the products possess the same excellent modification as is obtained by the use of an equal amount of either modifier alone.

This invention accordingly comprises the polymerization of butadiene-1,3 hydrocarbons in the presence of both a xanthogen compound and an aliphatic mercaptan containing at least 6 carbon atoms, and preferably at least 10 carbon atoms.

The xanthogen compound employed may be any compound of the general formula

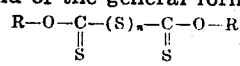

wherein R is the radical of a monohydric alcohol and $n$ is a small integer, particularly from 1 to 4. Included in this class of compounds are, for examples, the dialkyl dixanthogens or bis(alkyl xanthogens) wherein R in the above formula is an alkyl radical such as methyl, ethyl, isopropyl, n-butyl, sec-butyl, tert-amyl, n-hexyl, 2-ethyl hexyl or the like, and $n$ is two, which are the preferred materials particularly when the alkyl radicals contain less than ten carbon atoms; similar dixanthogens wherein R is some other radical of a monohydric alcohol, preferably containing less than ten carbon atoms, such as a tetrahydrofurfuryl, allyl, chloroethyl or cyclohexyl radical or the the like; and the corresponding monosulfides, trisulfides and tetrasulfides wherein $n$ in the above formula (instead of being two as in the case of the dixanthogens) is one, three or four.

Any aliphatic mercaptan containing more than six carbon atoms may be employed together with the xanthogen compound. Suitable mercaptans are, for examples, hexyl mercaptan, isoheptyl mercaptan, 2-ethylhexyl mercaptan, octadecyl mercaptan, decyl mercaptan, dodecyl or lauryl mercaptan, tributyl mercaptan, tri-isobutyl mercaptan, tetradecyl mercaptan, pentadecyl mercaptan, tri-amyl mercaptan, hexadecyl or cetyl mercaptan, octadecyl mercaptan, tetracosinyl mercaptan, ceryl mercaptan and the like. Mixtures of mercaptans whose average molecular weight correspond to more than six and preferably more than ten carbon atoms such as, for examples, "lorol" mercaptan, a mixture of mercaptans having an average of twelve carbon atoms, the mercaptans prepared from kerosene fractions known as "kerosene" or "keryl" mercaptans having an average of about twelve or more carbon atoms and similar mercaptan mixtures whether prepared from fatty alcohol mixtures or from hydrocarbon mixtures, may also be employed. All these mercaptans possess the general formula R—SH wherein R is an aliphatic hydrocarbon radical, which may be either saturated or unsaturated, normal, secondary or tertiary, containing at least six carbon atoms but ordinarily less than 25 carbon atoms.

While the advantages of this invention are obtained when using any of these aliphatic mercaptans with a xanthogen compound, it has been found that best results are secured when mercaptans containing at least 10 carbon atoms are employed. Of these the mercaptans containing 10 to 16 carbon atoms such as lauryl mercaptan have been found quite suitable for use in this invention. Mercaptan containing from 16 to 24 carbon atoms, cetyl mercaptan for example, also give excellent results and in this event the effect described herein is supplemented by the fact that such mercaptans remarkably accelerate the polymerization rate. The use of such 16 to 24 carbon atom mercaptans in the emulsion polymerization of butadiene-1,3 hydrocarbons is more fully described in my copending application, Serial No. 523,575, filed February 21, 1944.

The combination of aliphatic mercaptan and xanthogen compound is employed according to this invention in the polymerization in aqueous emulsion of any butadiene-1,3 hydrocarbon such as butadiene-1,3, isoprene, 2,3-dimethyl-butadiene-1,3, piperylene, and the like either alone or in admixture in any suitable proportions with one or more unsaturated compounds copolymerizable therewith in aqueous emulsion. Compounds copolymerizable with butadiene-1,3 hydrocarbons in aqueous emulsion include other butadiene-1,3 hydrocarbons, other conjugated dienes such as chloroprene, 2-cyano-butadiene-1,3, and the like and copolymerizable monoolefinic compounds such as styrene, vinyl naphthalene, p-chloro styrene, p-methoxy styrene and other aryl olefins; acrylonitrile, methacrylonitrile, alphachloro acrylonitrile, methyl acrylate, methyl methacrylate, ethyl methacrylate, allyl methacrylate, methyl-alpha-chloroacrylate, acrylic acid, methacrylic acid, acrylamide, methacrylamide and other polymerizable acrylic compounds; methyl vinyl ketone, methyl isopropenyl ketone, methyl vinyl ether, methylethynyl carbinol, diethyl fumarate, diallyl maleate, vinylidene chloride, vinyl acetate, vinyl pyridine, isobutylene and the like. When mixtures of butadiene-1,3 hydrocarbons with such copolymerizable compounds are employed it is preferable that the butadiene-1,3 hydrocarbon be present in a predominant amount, that is to the extent of at least 50% by weight of the mixture.

To illustrate the advantages of this invention and also the method of practicing the same the following examples are cited but it is to be understood that the invention is not to be limited by the details therein set forth. The parts are by weight.

Example I

A mixture of 70 parts of butadiene-1,3 and 30 parts of styrene is mixed with 0.2 part of bis(isopropyl xanthogen) and with 0.9 part of cetyl mercaptan and is then emulsified with an aqueous solution containing 160 parts of water, 5 parts of fatty acid soaps as an emulsifying agent, 0.3 part of hydrogen peroxide as a polymerization initiator and 0.05 part of a catalyst mixture comprising complex pyrophosphates of iron and cobalt. The emulsified monomers are then allowed to polymerize by agitating the emulsion at a temperature of 40° C. for 14 hours; and at the end of this time the latex obtained is coagulated to yield the rubbery butadiene-1,3 styrene copolymer obtained as the product of the polymerization.

It is found that the polymerization has proceeded to 88% conversion (i. e., an 88% yield of polymer based on the monomers is obtained) in 14 hours at 40° C. and that the rubbery copolymer obtained is quite plastic and easily milled (having a Goodrich plasticity of about 90 at 100° C.) and is about 90% soluble in benzene. When the copolymer is compounded in a typical test recipe and vulcanized for 45 minutes at 310° F. it is found to possess a tensile strength of 4900 lbs./sq. in. and an ultimate elongation of 770%.

When the above example is repeated except that no cetyl mercaptan is employed, the polymerization proceeds only to 65% conversion after 14 hours at 40° C. The product obtained possesses substantially the same plasticity and solubility and when vulcanized in the same manner possesses a tensile strength of 4615 lbs./sq. in. and an ultimate elongation of 715%, thus showing that the presence of the cetyl mercaptan together with the xanthogen remarkably increased the rate of polymerization (from 65% to 88% conversion) without adversely affecting the quality of the product. Moreover, when the example is repeated using larger proportions of the dixanthogen without any cetyl mercaptan, it is found that the conversion is even less and that the tensile strength of the product is unimproved.

On the other hand when the above example is repeated except that no bis(isopropyl xanthogen) is employed, the product obtained is deficient in plasticity and solubility (being only about 20% soluble in benzene) and when vulcanized in the same manner possess a tensile strength of only 3225 lbs./sq. in. and an ultimate elongation of only 400%. Moreover, the tensile strength of the product is not improved by using other proportions of cetyl mercaptan and no dixanthogen.

In the absence of both the bis(isopropyl xanthogen) and the cetyl mercaptan, the polymerization proceeds to 70% conversion in 14 hours, the product is deficient in plasticity and solubility, and when vulcanized possesses a tensile strength of 3275 lbs./sq. in. and a 375% elongation.

It is thus seen that plastic soluble products possessing high tensile strength are obtained in high yields in a short time when both a xanthogen compound and cetyl mercaptan are present during the polymerization whereas this is not possible in the absence of either or both of these compounds.

Example II

Mixtures of 70 parts of butadiene-1,3 and 30 parts of styrene are each emulsified in 200 parts of a 2.5% fatty acid soap solution and are then polymerized at 40° C. in the presence of either hydrogen peroxide or potassium persulfate as a polymerization initiator and in the presence of either "lorol" mercaptan or bis(isopropyl xanthogen) or both. The yield of polymer obtained in a given time and the tensile strengths of the polymers obtained in each case are shown in the following table:

| Modifiers | | Initiator | Yield | Time | Tensile strength |
|---|---|---|---|---|---|
| BIX [1] | LM [2] | | | | |
| Parts | Parts | | Per cent | Hours | Lbs./sq. in. |
| None | 0.6 | H$_2$O$_2$—0.3 part | 90 | 23 | 3,000 |
| 0.3 | 0.3 | ......do...... | 89 | 23 | 4,150 |
| 0.6 | None | ......do...... | 80 | 23 | 3,400 |
| None | 0.6 | K$_2$S$_2$O$_8$—0.34 part | 100 | 48 | 2,600 |
| 0.3 | 0.3 | ......do...... | 100 | 48 | 3,850 |
| 0.45 | 0.15 | ......do...... | 95 | 48 | 3,900 |
| 0.60 | None | ......do...... | 80 | 48 | 3,250 |

[1] BIX=bis(isopropyl xanthogen).
[2] LM="lorol" mercaptan.

It is seen from the table that the products prepared in the presence of both the xanthogen compound and a mercaptan possess a higher tensile strength than the products prepared in the presence of either compound alone; and that the speed of polymerization when both compounds are present is substantially as fast as that when none of the xanthogen compound is present.

As may be noted from the above examples the advantages of the invention are not dependent upon the use of any particular proportions of the xanthogen compound and the mercaptan; hence their proportions are not critical and may be varied widely. In general, however, it is desirable to employ from about 0.1 to 1% by weight based on the weight of the material polymerized of each of the modifiers, preferably with the ratio of mercaptan to xanthogen compound ranging from ¼:1 to 4:1.

It is also possible to vary the conditions of the polymerization considerably while still obtaining the advantages of the invention. Thus any convenient temperature of polymerization, which, may vary from 20 to 100° C., may be employed. Moreover, various emulsifying agents including alkali metal hymolal sulfates such as sodium lauryl sulfate, alkali metal aryl or alkaryl sulfonates such as sodium isobutyl naphthalene sulfonate, salts of high molecular weight bases such as cetyl piperidinium bromide, soaps of rosin acids and dehydrogenated rosin acids and the like, as well as fatty acid soaps used in the examples, may be employed as emulsifying agents for the emulsion polymerization. Other polymerization initiators, in addition to hydrogen peroxide and potassium persulfate employed in the examples, such as benzoyl peroxide and other peroxides, sodium perborate and other per-salts, and other types of initiators such as diazo amino benzene may be present during the polymerization. Still other substances known to influence the polymerization in a favorable manner such as polymerization catalysts including water-soluble heavy metal compounds such as cobaltous chloride and sodium ferri pyrophosphate may also be present during the polymerization.

The preferred conditions for the polymerization, however, are the use of soaps as the emulsifying agent, peroxides, particularly hydrogen peroxide, as the polymerization initiator and polymerization temperatures of 20 to 60° C., since under these conditions the combination of modifiers disclosed has been found to produce the highest quality polymers in the shortest possible time.

The various ingredients of the emulsion may all be added prior to polymerization or a part or all of certain ingredients may be added stepwise or continuously to the emulsion during the course of the polymerization. For example it has been found desirable to add the hydrogen peroxide employed as the initiator in stages during the polymerization particularly when temperatures as high as about 50° C. are employed. Another expedient, also often preferred, is to add the mercaptan prior to the beginning of the polymerization and to add the dixanthogen continuously or in stages after the polymerization has begun. This procedure is particularly valuable when the mercaptan is "lorol" mercaptan or some other mercaptan containing from 10 to 16 carbon atoms since high yields of high tensile polymers possessing excellent modification are thereby obtained.

Still other variations and modifications will occur to those skilled in the art and are within the spirit and scope of the appended claims.

I claim:

1. The method which comprises polymerizing in aqueous emulsion a butadiene-1,3 hydrocarbon in the presence of a mixture of a xanthogen compound of the formula

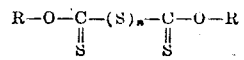

wherein R is the radical of a monohydric alcohol and $n$ is an integer from 1 to 4, with an aliphatic mercaptan containing from 6 to 24 carbon atoms.

2. The method which comprises polymerizing in aqueous emulsion a mixture of a butadiene-1,3 hydrocarbon and an unsaturated compound copolymerizable therewith in aqueous emulsion, in the presence of a mixture of a xanthogen compound of the formula

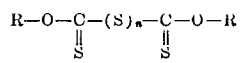

wherein R is a radical of a monohydric alcohol containing less than ten carbon atoms and $n$ is an integer from 1 to 4, with an aliphatic mercaptan containing from 6 to 24 carbon atoms.

3. The method which comprises polymerizing in aqueous emulsion a mixture of a butadiene-1,3 hydrocarbon and an unsaturated compound copolymerizable therewith in aqueous emulsion, in the presence of a mixture of a bis(alkyl xanthogen) wherein the alkyl radical contains less than 10 carbon atoms, with an aliphatic mercaptan containing from 10 to 16 carbon atoms.

4. The method of claim 3 wherein the xanthogen is bis(isopropyl xanthogen).

5. The method of claim 3 wherein the bis(alkyl xanthogen) is bis(isopropyl xanthogen) and the aliphatic mercaptan contains 12 carbon atoms.

6. The method of claim 3 wherein the bis(alkyl xanthogen) is bis(isopropyl xanthogen) and the aliphatic mercaptan is lauryl mercaptan.

7. The method which comprises polymerizing in aqueous emulsion a mixture of butadiene-1,3 and styrene in the presence of a mixture of a bis(alkyl xanthogen) wherein the alkyl radical contains less than 10 carbon atoms, with an aliphatic mercaptan containing from 10 to 16 carbon atoms.

8. The method of claim 7 wherein the bis(alkyl xanthogen) is bis(isopropyl xanthogen) and the aliphatic mercaptan is lauryl mercaptan.

CHARLES F. FRYLING.